United States Patent
Kotikovsky

(10) Patent No.: US 7,654,618 B2
(45) Date of Patent: Feb. 2, 2010

(54) WEBBING TACK

(75) Inventor: Alexander P. Kotikovsky, West Bloomfield, MI (US)

(73) Assignee: TK Holdings Inc., Auburn Hills, MI (US)

(*) Notice: Subject to any disclaimer, the term of this patent is extended or adjusted under 35 U.S.C. 154(b) by 633 days.

(21) Appl. No.: 11/159,369

(22) Filed: Jun. 23, 2005

(65) Prior Publication Data

US 2006/0226647 A1    Oct. 12, 2006

Related U.S. Application Data

(60) Provisional application No. 60/669,382, filed on Apr. 8, 2005.

(51) Int. Cl.
  *B60R 22/12* (2006.01)
  *B60R 22/30* (2006.01)

(52) U.S. Cl. .................. 297/481; 24/711.1; 29/525.01; 280/801.1

(58) Field of Classification Search ............. 280/801.1; 297/468, 481; 227/67; 24/711.1; 36/169; 5/240; 29/525.01
  See application file for complete search history.

(56) References Cited

U.S. PATENT DOCUMENTS

| | | | |
|---|---|---|---|
| 3,444,597 A | 5/1969 | Bone | |
| 3,765,110 A | 10/1973 | Olsen | |
| 4,347,932 A | 9/1982 | Furutu | |
| 4,583,762 A * | 4/1986 | Carlstedt | 280/801.1 |
| D286,166 S | 10/1986 | Russell | |
| 4,615,081 A * | 10/1986 | Lindahl | 24/90.1 |
| 4,971,238 A | 11/1990 | Furutsu | |
| 5,031,962 A * | 7/1991 | Lee | 297/484 |
| 5,373,656 A * | 12/1994 | Merser | 40/663 |
| 5,573,456 A | 11/1996 | Benoit | |
| 5,639,006 A | 6/1997 | Kim | |
| 5,860,706 A * | 1/1999 | Fausel | 297/481 |
| 5,878,935 A | 3/1999 | Furutsu | |
| 5,954,365 A * | 9/1999 | Wier et al. | 280/801.1 |
| 5,983,540 A | 11/1999 | Ashley | |
| D425,133 S | 5/2000 | Ueno | |
| 6,062,384 A | 5/2000 | Ueno | |
| 6,199,597 B1 * | 3/2001 | David | 139/383 R |
| 6,240,606 B1 | 6/2001 | Hiroki | |
| 6,308,386 B1 | 10/2001 | Cooper | |
| 6,419,264 B1 * | 7/2002 | Tsuji et al. | 280/733 |
| 6,419,271 B1 * | 7/2002 | Yamada et al. | 280/806 |
| 6,568,709 B2 * | 5/2003 | Schneider et al. | 280/801.1 |
| 7,100,944 B2 * | 9/2006 | Stanley | 280/801.1 |

(Continued)

FOREIGN PATENT DOCUMENTS

DE    19535794 A1    4/1998

(Continued)

*Primary Examiner*—Christopher Bottorff
*Assistant Examiner*—Karen Jane J. Amores
(74) *Attorney, Agent, or Firm*—Foley & Lardner LLP

(57) ABSTRACT

A webbing tack in a seat belt prevents overspooling in the seat belt webbing. The webbing tack is configured to be temporarily tacked. The webbing tack includes an elongated filament and first and second bars; each bar is attached to opposite ends of the filament. The filament extends through first and second layers of the webbing, the first bar is positioned adjacent the first layer and the second bar is positioned adjacent the second layer.

10 Claims, 4 Drawing Sheets

U.S. PATENT DOCUMENTS

| | | |
|---|---|---|
| 2002/0121538 A1 | 9/2002 | Cooper |
| 2002/0180199 A1* | 12/2002 | Schneider et al. ........ 280/801.1 |
| 2004/0135359 A1* | 7/2004 | Stanley et al. ............ 280/801.1 |
| 2006/0157967 A1* | 7/2006 | Edwards ................... 280/801.1 |
| 2006/0226647 A1* | 10/2006 | Kotikovsky .............. 280/801.1 |
| 2007/0069515 A1* | 3/2007 | Sakata ........................ 280/806 |

FOREIGN PATENT DOCUMENTS

| | | |
|---|---|---|
| EP | 0 825 120 B1 | 12/2001 |
| WO | WO 00/51792 A2 | 9/2000 |
| WO | WO 01/26997 A1 | 4/2001 |

\* cited by examiner

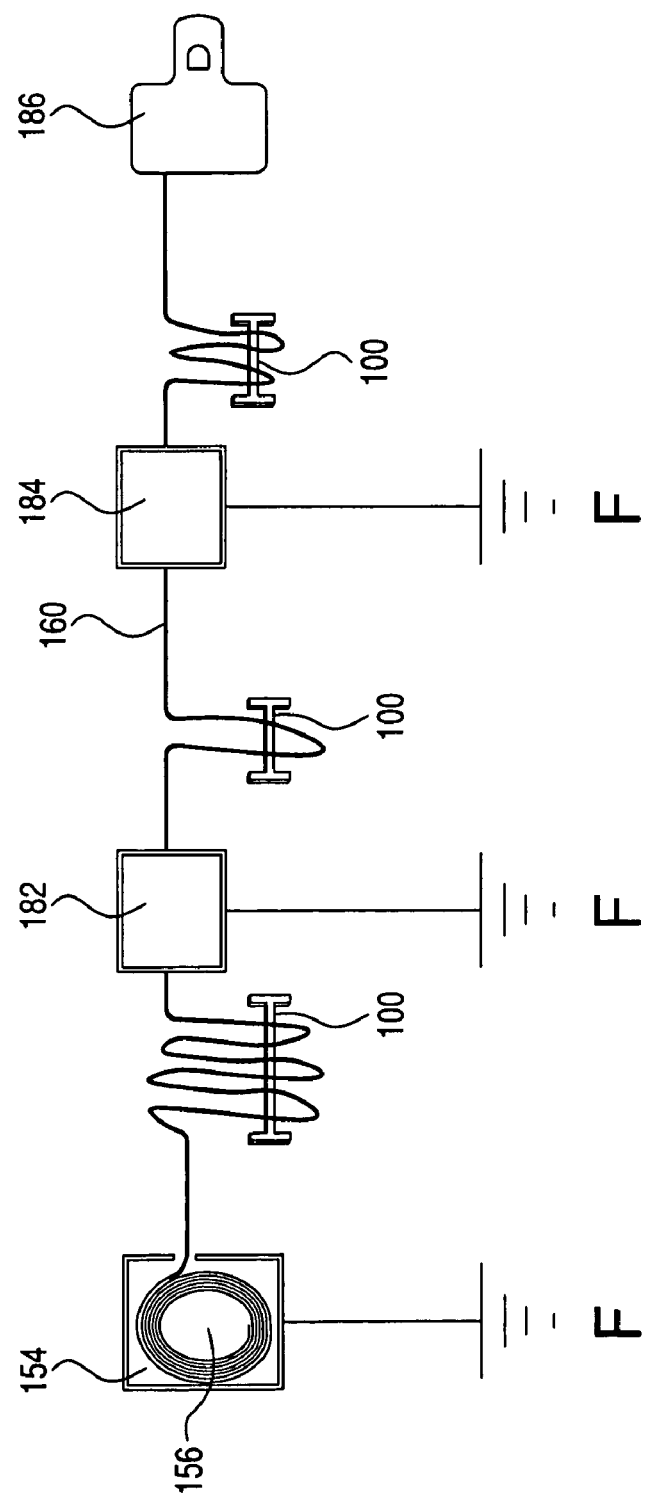

US 7,654,618 B2

WEBBING TACK

CROSS-REFERENCE

This application is an application claiming the benefit under 35 U.S.C. 119(e) of U.S. application 60/669,382, filed Apr. 8, 2005, incorporated herein by reference in its entirety.

BACKGROUND

The present invention relates generally to the field of fasteners for seat belts that prevent a seat belt webbing from over spooling or unwrapping during shipping.

When seat belts are shipped or stored, the webbing can roll up around a spool of a retractor. When the webbing overspools, too much of the webbing rolls up around the spool. Overspooling can prevent or render difficult installation of the retractor in a vehicle.

Conventional fasteners have been used to counteract the overspooling problem by holding a spooled and rolled seat belt webbing in place while the seat belt is being shipped. Such conventional fasteners include a webbing fork or a clip. Conventional fasteners are generally heavy and create a great amount of waste. The webbing forks can be expensive to make as well as to ship because the webbing forks are heavy.

SUMMARY

One embodiment of the invention relates to a seat belt device. The seat belt device includes a seat belt with a webbing and a webbing tack. The webbing tack extends through a section of the webbing and is configured to prevent a release of webbing section.

Another embodiment of the invention provides a method of preventing overspooling in seat belt webbing. The method comprises folding up a portion of a webbing to form a folded portion, fastening a webbing tack through at least two layers of the webbing, and preventing the folded portion from unfolding.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 2b is a top, schematic view of a seat belt fastened with a plurality of webbing tacks.

DETAILED DESCRIPTION

Hereinafter, embodiments of the present invention will be described with reference to the attached drawings.

Figure 1:
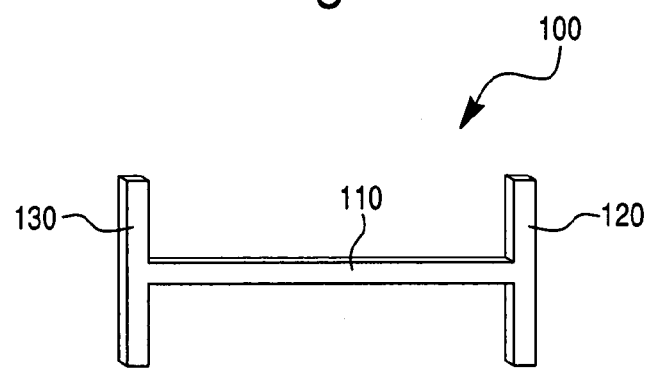
FIG. 1 is a top planar view of a webbing tack.

FIG. 1 shows a webbing tack 100 according to an embodiment of the present invention. The webbing tack includes a filament 110 and first 120 and second 130 bars. The first 120 and second 130 bars are positioned on opposite ends of the filament 110, forming a generally "H" shape. The first 120 and second 130 bars are each generally perpendicular to the filament 110.

Figure 2A:
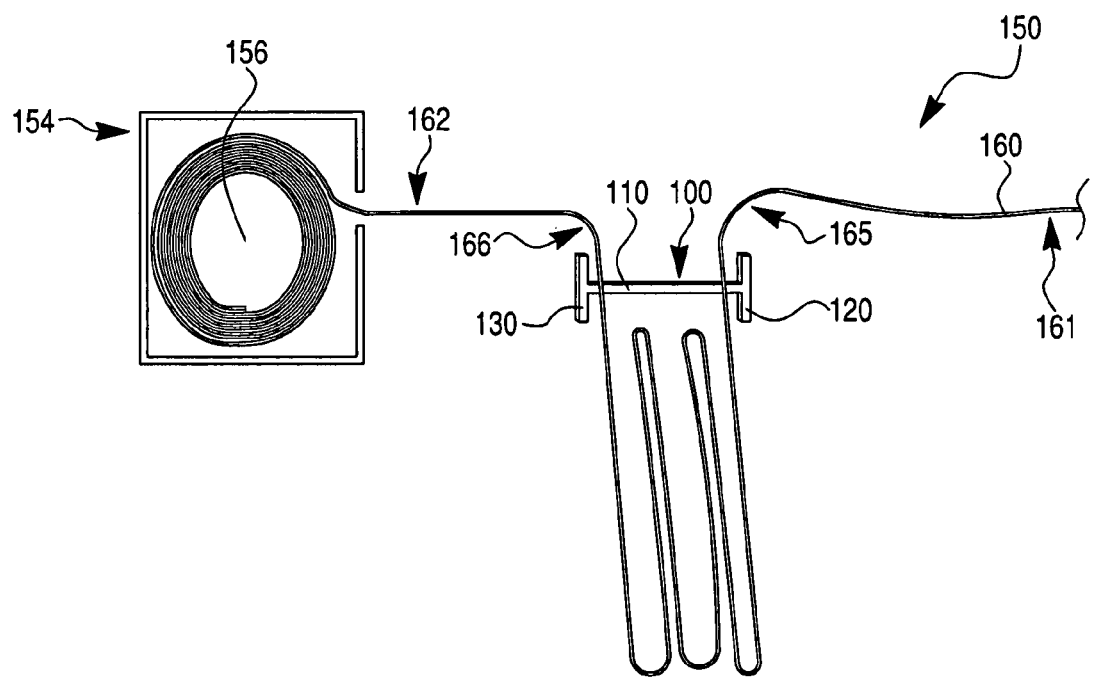
FIG. 2a is a top, schematic view of the webbing tack fastened to a seat belt webbing.

FIGS. 2(a) and 2(b) show the webbing tack 100 fastening together webbing 160 of a seat belt 150, such as during shipping or storage of the seat belt 150. Generally, when seat belts 150 are shipped that are not fastened, the webbing 160 can overspool. The webbing tack 100 is fastened to the webbing 160 to prevent such a problem.

According to the embodiment shown in FIG. 2(a), an end 161 of the webbing attaches to a tongue for a seat belt buckle or other component of a vehicle, another end 162 of the webbing 160 attaches to a spool 156 of a retractor 154. The webbing 160 is wound at least partially around the spool 156 with a portion of the webbing 160 located outside of the retractor 154. The webbing 160 is folded or rolled up and the webbing tack 100 is fastened to the seat belt webbing 160. The webbing tack 100 helps maintain the shape and position of the webbing 160 and helps prevent overspooling of the webbing 160. The tacked portion of the webbing 160 may be located between any of the various seat belt components mentioned above, as required by shipping or installation requirements or considerations.

The webbing 160 can also be attached to various seat belt components including a D ring 182, an anchor 184, or any other suitable attachment device or accessory. FIG. 2(b) shows the webbing 160 attached to a spool 156 of a retractor 154, a D ring 182, an anchor 184 and a seat belt tongue 186. These components can be attached or operatively connected to a floor F of a vehicle. The webbing tack 100, or a plurality of webbing tacks 100 as shown in FIG. 2(b), can be attached to the webbing between any of these components.

Figure 3:
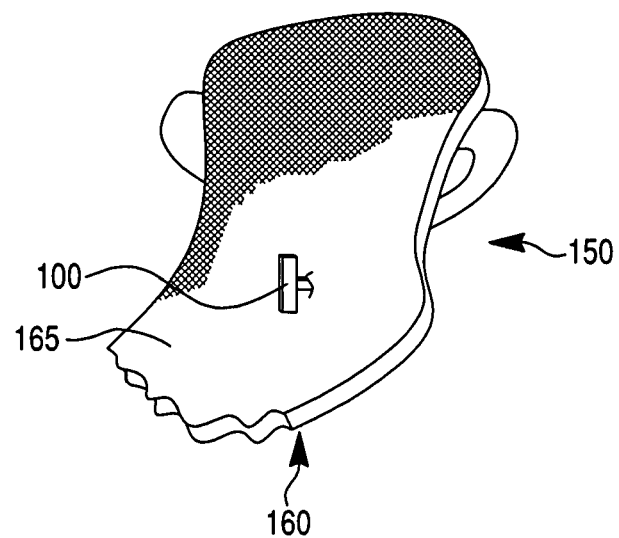
FIG. 3 is a front view of the webbing tack fastened to the seat belt webbing.
Figure 4:
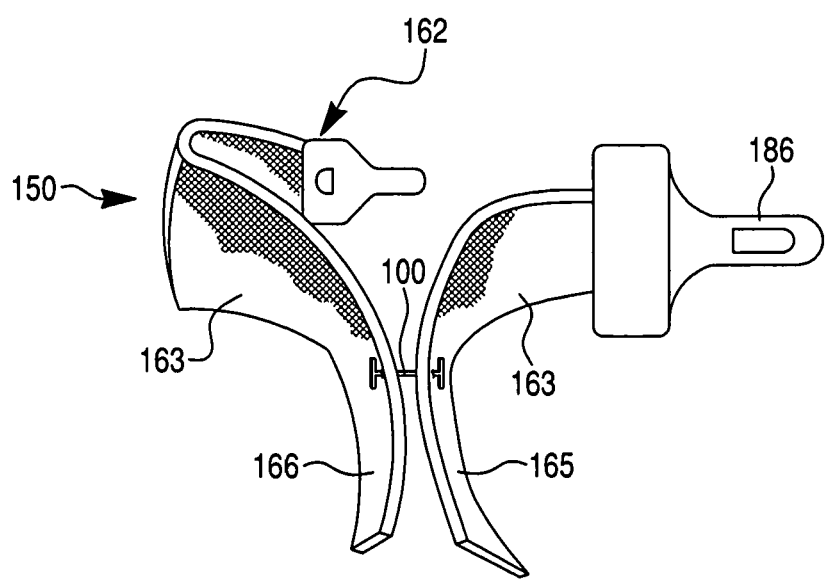
FIG. 4 is a detail perspective view showing the webbing tack fastened to the seat belt webbing.
Figure 5:
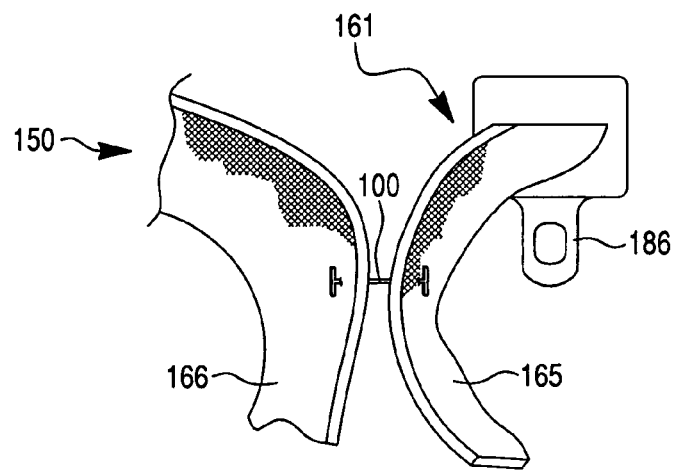
FIG. 5 is another detail perspective view showing the webbing tack fastened to the seat belt webbing.

The webbing tack 100 is fastened to the seat belt webbing 160 such that the filament extends through a first layer 165 and a second layer 166 of the webbing 160, such as can be seen in FIGS. 3-5. The first bar 120 is positioned adjacent the outer surface 163 of the first layer 165. The second bar 120 is positioned adjacent the outer surface 163 of the second layer 166.

The webbing tack 100 can be fastened to the seat belt webbing 160 through any suitable manner. For example, the webbing tack 100 can be fastened to the webbing 160 by a standard dispensing tool, such as that shown in U.S. Pat. Nos. 5,878,935; 5,639,006; or 4,971,238 (all of which are hereby incorporated by reference herein in their entirety).

The webbing tack 100 can be made of plastic or any other suitable material. Additionally, the size of the webbing tack 100 can vary. For instance, the first 120 and second 130 bars can vary in length such that they are not much longer than the width of the filament 110. Additionally, the length of the filament 110 can vary. The length of the filament 110 can be such that the first 161 and second 162 layers of webbing 160 are left with a gap or space between them. This gap can allow for scissors, knife or other tool to break or remove the webbing tack 100 when necessary. Alternatively, the length of the filament 110 can be such that the first 161 and second 162 layers of webbing 160 are touching where the webbing tack 100 is fastened. In another embodiment, the webbing tack 100 can be comprised of a thin fish-line material.

The webbing tack 100 can be used to fasten together layers of webbing 160 wherever appropriate. For instance, the webbing tack 100 could be used to fasten together layers of the webbing 160 between the floor F of a vehicle and the seat belt buckle. The webbing tack 100 could also include a breakable or weakened area such that removal of one of the first 120 or second 130 bars is easily removed.

Figure 6:
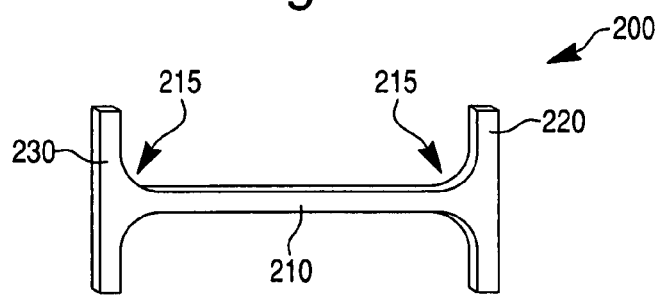
FIG. 6 is a top view of a webbing tack according to another embodiment of the present invention.
Figure 7:
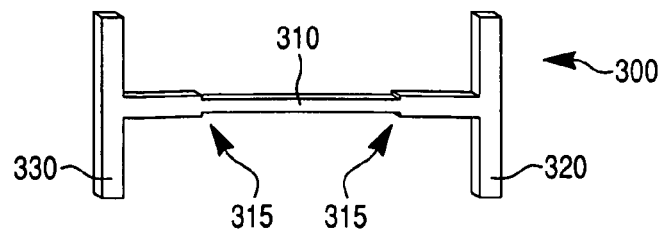
FIG. 7 is a top view of a webbing tack according to another embodiment of the present invention.

FIGS. 6 and 7 show alternative embodiments of a webbing tack. FIG. 6 shows a webbing tack 200 that comprises a tapered section 215. The webbing tack 200 includes the filament 210 with first 220 and second 230 bars on either end. The tapered section 215 is the section of the filament 210 meeting the first 220 or second 230 bar. FIG. 7 shows another embodiment of a webbing tack 300 in which the filament 310 includes a stepped section 315 at either end. The stepped section 315 has a greater diameter or width than the remainder of the filament. In FIG. 7, the stepped sections 315 are at either end of the filament 310 adjacent the first 320 and second 330 bars.

It will be recognized that the webbing tack 100 can include any suitable shape. For instance, the webbing tack 100 can include ends which prevent the tack 100 from being removed from the seat belt webbing 160. The ends can be similar to a head of a pin, a round protrusion, a flat section or merely an extension of a filament that is wider than the portion that extends through the webbing 160.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt device, comprising:
   a seat belt with a webbing; and
   a webbing tack extending through a section of the webbing and configured to prevent a release of a folded or bunched webbing section;
   wherein the webbing tack includes an elongated filament with first and second ends, wherein the filament extends through a portion of the webbing and the ends are configured to prevent the filament from being removed from the webbing;
   wherein the first and second ends comprise first and second bars, respectively, each bar being attached to opposite ends of the filament;
   wherein when the filament extends through first and second layers of the webbing, the first bar is positioned adjacent the first layer and the second bar is positioned adjacent the second layer.

2. The seat belt device according to claim 1, wherein the first and second bars are positioned perpendicular to the filament.

3. The seat belt device according to claim 1, wherein the filament comprises a tapered section configured to taper outward at a connection with one of the first and second bars.

4. The seat belt device according to claim 1, wherein the filament comprises a center section and a stepped section, the stepped section having a greater width than the center portion.

5. The seat belt device according to claim 1, wherein the filament extends between the webbing at a point between a first and second components of the seat belt.

6. The seat belt device according to claim 5, wherein one of the components comprises a D-ring.

7. The seat belt device according to claim 5, wherein one of the components comprises a tongue.

8. The seat belt device according to claim 5, wherein one of the components comprises an anchor.

9. The seat belt device according to claim 5, wherein one of the components comprises a retractor spool.

10. The seat belt device of claim 1, wherein the tack is configured to break and release the webbing when a force is applied to the webbing.

\* \* \* \* \*